UNITED STATES PATENT OFFICE.

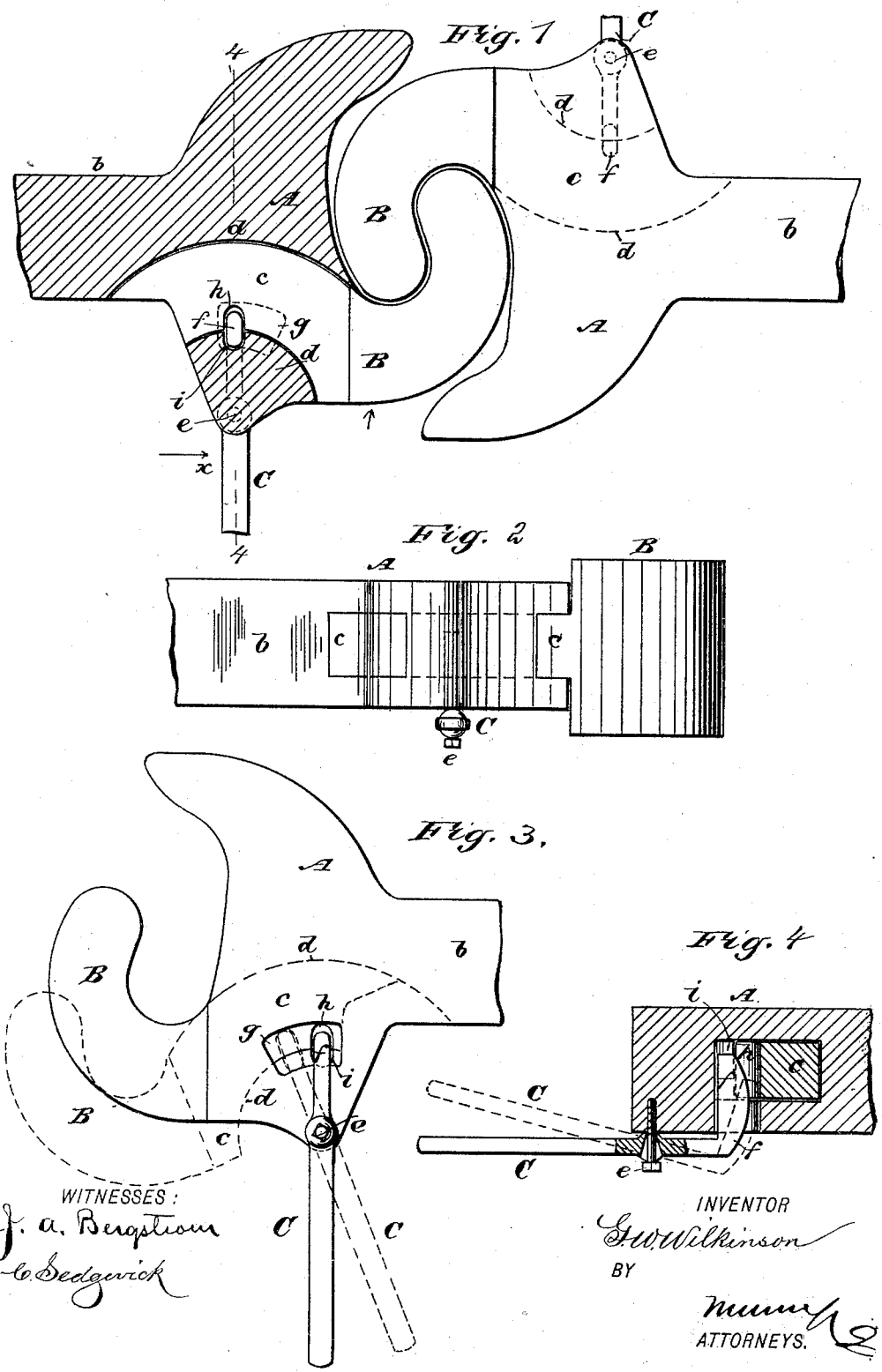

GEORGE W. WILKINSON, OF CHICAGO, ILLINOIS.

CAR-COUPLING.

SPECIFICATION forming part of Letters Patent No. 482,605, dated September 13, 1892.

Application filed April 29, 1892. Serial No. 431,183. (No model.)

*To all whom it may concern:*

Be it known that I, GEORGE W. WILKINSON, of Chicago, in the county of Cook and State of Illinois, have invented a new and useful Improvement in Car-Couplers, of which the following is a full, clear, and exact description.

This invention relates to that description of car-couplers which are provided with a movable knuckle and hook with one another when coupling; and it consists in a novel construction and combination of parts in such a coupler, substantially as herein shown and described, and whereby great simplicity, durability, and other advantages, as hereinafter set forth, are obtained.

Reference is to be had to the accompanying drawings, forming a part of this specification, in which similar letters of reference indicate corresponding parts in all the figures.

Figure 1 represents a top or plan view of two coupling draw-heads in part embodying my invention and in engagement with one another. Fig. 2 is a side view of one of said draw-heads in part. Fig. 3 is an inverted plan or under view of the same, showing the coupler closed in full lines and open in dotted lines; and Fig. 4 is a transverse section upon the line 4 4 in Fig. 1, looking in the direction of the arrow $x$.

Both draw-heads or couplers of two adjacent cars are constructed alike of hook form to engage with one another, as shown in Fig. 1, and occupy a horizontal position. Each one is composed of but two parts, consisting of a stationary partly hook-shaped head part A, integral with the draw-bar $b$, and a movable or sliding hook-shaped knuckle B, of arc shape and reduced in thickness at its joint or tail end $c$, where it works through a correspondingly-shaped slot $d$ in the fixed head part A to give it its required knuckle-like action. This knuckle part B and a lever C which engages and releases it are the only two movable parts of each coupler.

The lever C is loosely pivoted, as at $e$, to the under side of the fixed head part A, so as to admit of it not only playing around said pivot but also of moving up and down relatively to the approximately horizontal plane in which it lies. The shorter arm of said lever has an upturned hook or nose $f$, adapted to enter up within an aperture $g$ in the under side of the stationary head part A and there to engage, when the knuckle part B is closed or moved, to couple, as shown by full lines, with a notch $h$ in the tail end $c$ of the knuckle part B and with a notch $i$ in that portion of the head part A over or against which said tail end $c$ moves. This locks or holds the hook-shaped knuckle part B in its closed or coupling position, (shown by full lines in the drawings,) and the gravity of the longer arm of the loosely-pivoted lever C holds the upturned nose $f$ of said lever thus engaged and the knuckle part B in its closed or coupled position. By slightly raising the outer arm of the lever C, as shown by dotted lines in Fig. 4, its nose $f$ is released from engagement with the notch $i$ in the stationary head part A, and by moving said lever backward, as shown by dotted lines in Fig. 3, the knuckle part B of the coupler is opened, ready for coupling again, as shown by dotted lines in said Fig. 3. The lever C provides for the opening and closing of the coupler from the outside of the car, and the coupler is approximately automatic. There is no pin running up through it to be operated by lever and chain, or lever alone, and no chance for the rain to run down and rust out the working parts or to freeze in cold weather and make it difficult without breakage of the operating mechanism to move or work the coupler. The movable parts being only two there is but little liability to get out of repair, and the whole coupler is both simple, durable, and strong; and by the arrangement of the operating-lever on the under side of it the working parts are protected from the weather and there is no direct lever connection of any kind with the car the coupler is applied to.

Having thus described my invention, I claim as new and desire to secure by Letters Patent—

In a car-coupler of the description herein referred to, the combination of the movable hook-shaped knuckle part having a notch in its joint or tail portion, the stationary head part slotted to receive said tail portion within or through it, and having a corresponding notch in its portion over or against which said tail portion moves and an opening in its under side facing said notches, and the laterally-projecting lever loosely pivoted to the head part to admit of its being moved upward and backward or forward from the under side of the head part, said lever being provided with a nose or hook at its inner end adapted to engage with the notch in the tail portion of the knuckle part and to engage with or disengage from the notch in the stationary head part of the coupler, substantially as specified.

GEORGE W. WILKINSON.

Witnesses:
PAUL E. BUEDEFELDT,
OSCAR FELDSCHER.